United States Patent [19]

Robertson et al.

[11] Patent Number: 5,659,592
[45] Date of Patent: Aug. 19, 1997

[54] PATIENT IDENTIFICATION MEANS FOR X-RAY CASSETTE

[75] Inventors: Jeffrey C. Robertson; David P. Trauernicht; David M. Orlicki, all of Rochester, N.Y.

[73] Assignee: Eastman Kodak Company, Rochester, N.Y.

[21] Appl. No.: 740,642

[22] Filed: Oct. 31, 1996

[51] Int. Cl.$^6$ ..................................................... H05G 1/28
[52] U.S. Cl. ........................... 378/165; 378/185; 378/187; 378/182; 250/484.4
[58] Field of Search .......................... 378/182, 183, 378/184, 185, 187, 169, 165; 250/484.4

[56] References Cited

U.S. PATENT DOCUMENTS

| | | | |
|---|---|---|---|
| 1,374,875 | 4/1921 | Bethke. | |
| 1,974,174 | 9/1934 | Chamberlain | 95/1.1 |
| 3,466,440 | 9/1969 | Tone et al. | 23/4 |
| 3,631,243 | 12/1971 | Byler et al. | 250/67 |
| 4,095,111 | 6/1978 | Katz et al. | 250/476 |
| 4,507,797 | 3/1985 | Kato | 378/165 |
| 4,983,021 | 1/1991 | Bollen et al. | 378/185 |

FOREIGN PATENT DOCUMENTS 0 014 436 A1   1/1980   European Pat. Off. ....... G03B 41/16

OTHER PUBLICATIONS

"Phosphors for the conversion of infrared radiation into visible light", J.L. Sommerdijk and A. Bril, Philips Technical Review, vol. 34, p. 24 (1974).
"NaYF$_4$:Yb,Er—an efficient upconversion phosphor", N. Menyuk et al, Appl. Phys. Lett., vol. 21, No. 4, p. 159 (1972).

*Primary Examiner*—Don Wong
*Attorney, Agent, or Firm*—James D. Leimbach

[57] ABSTRACT

A patient identification x-ray cassette comprising: a cover having a window in the cover with predetermined transmission characteristics; a prompt emission stimulable phosphor coated substrate positioned essentially below the window having a phosphor that is selected to absorb at a first bandwidth and emit at a second bandwidth and the substrate is selected to transmit at least the first bandwidth; an image receiving element sensitive to electromagnetic radiation of the second bandwidth positioned at least below the window; and placing the phosphor coated substrate against the image receiving element. The phosphor is of the type that absorbs energy in the infrared portion of the electromagnetic spectrum and emits energy in the visible portion of the electromagnetic spectrum. The substrate upon which the coating is placed is relatively transparent to infrared wavelengths. The cassette allows for patient identification data to be written onto the x-ray film contained inside the cassette via an infrared source.

13 Claims, 1 Drawing Sheet

PATIENT IDENTIFICATION MEANS FOR X-RAY CASSETTE

FIELD OF THE INVENTION

The present invention relates generally to the field of X-rays, and in particular to X-ray cassettes. More specifically, the invention relates to an x-ray cassette having features to allow the placing of patient identification on an image receiving element within the cassette.

BACKGROUND OF THE INVENTION

In the field of radiography it is common to enclose an x-ray film in a cassette, sandwiching the film between the surfaces of intensifying screens, which are mounted on foam pads affixed to the interior surfaces of top and bottom panels which form two opposing sides of the cassette. Normally, the top and bottom panels are attached along one edge of each to a hinge to allow the cassette to be opened for insertion of a fresh film, or removal of an exposed film. A latch means is usually provided on the edges opposite the hinge edge, to hold the cassette in the closed state, and both panels have borders on all four edges that cooperate to keep light from entering the closed cassette.

Often, cassettes of the above type contain means to allow patient identification data to be optically printed onto a portion of the x-ray film contained within the cassette. Typically, this comprises an aperture through one of the panels, generally located over one corner of the enclosed film. Commonly the aperture has a sliding shutter, which is closed to render the cassette light tight, and opened, to allow the patient identification information to be optically projected onto the film, through the aperture. The sliding shutter usually has locking means to hold it in the closed position, said locking means being defeated by mechanical or magnetic elements in a patient identification camera designed to work with the shutter locking means.

Patient identification windows of the above type may on occasion fail to open properly, resulting in a failure to properly transfer the patient identification to the film, or they may fail to close properly, resulting in fogging of the enclosed film.

From the foregoing discussion it should be apparent that there remains a need in the art for a patient identification system that can operate effectively without moving parts.

SUMMARY OF THE INVENTION

The present invention is directed to overcoming one or more of the problems set forth above by providing a novel form of patient identification that requires no moving parts, and no mechanical interface with a properly designed patient identification camera. Briefly summarized, according to one aspect of the present invention a patient identification x-ray cassette comprising:

a cover;

a window in the cover having predetermined transmission characteristics;

a prompt emission stimulable phosphor coated substrate positioned essentially below the window having a phosphor that is selected to absorb at a first bandwidth and emit at a second bandwidth and the substrate is selected to transmit at least the first bandwidth;

an image receiving element sensitive to electromagnetic radiation of the second bandwidth positioned at least below the window; and means for placing the phosphor coated substrate against the image receiving element.

These and other aspects, objects, features, and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has advantages over mechanically based patient identification systems in that it is not subject to the mechanical failures of these systems.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1:
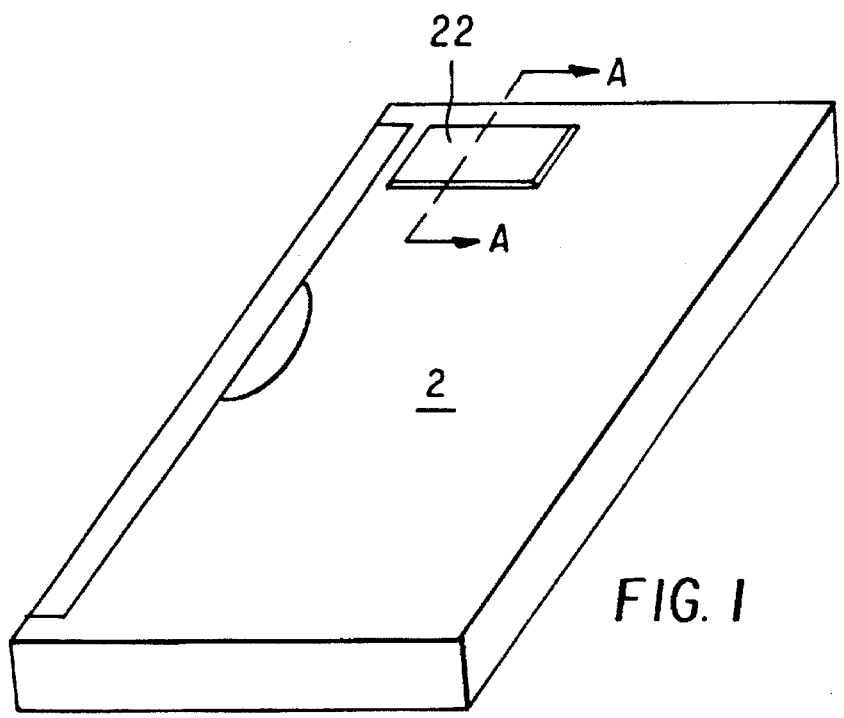
FIG. 1 is an oblique view of an x-ray cassette with an improved patient identification window.
Figure 2:
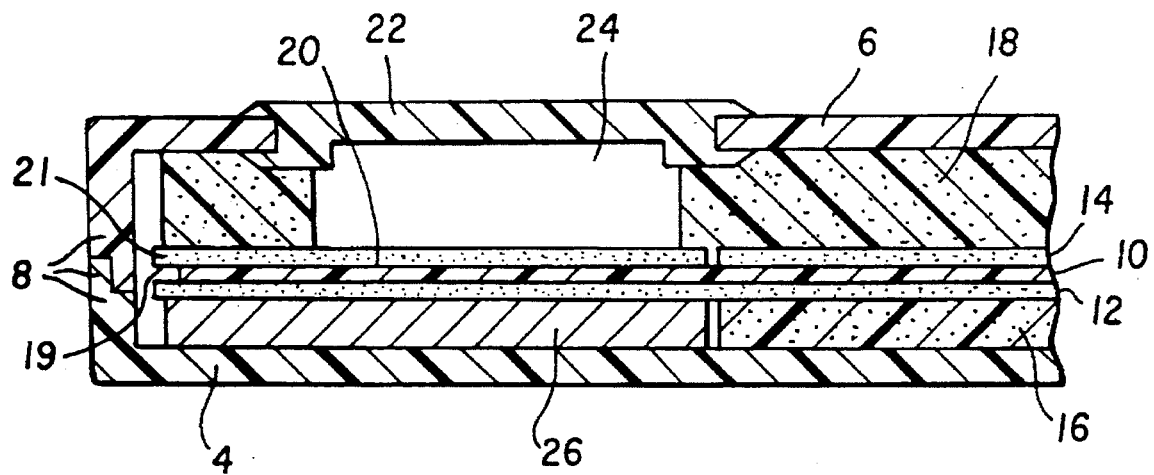
FIG. 2 is a cross section view taken along plane A—A of FIG. 1.

Referring to FIG. 1, an oblique view of an x-ray cassette with an improved patient identification window, x-ray cassette 2 is constructed from a first side panel, which normally faces the x-ray source during a radiographic procedure, hereinafter referred to as a tube side panel 4, and a second side panel, hereinafter referred to as a cover 6. The panels are joined along one edge of each to a hinge means (not shown), and are provided with latching means (not shown) along edges of each opposing the hinge edges. Suitable light locking structures 8 are provided along all edges of cassette 2.

Suitable prompt emission phosphor intensifying screens 12, 14 are mounted on resilient foe pads 16, 18, which are affixed to the interior surfaces of tube side 4 and cover 6. The phosphor is chosen to absorb x-ray wavelengths, and to emit in the blue and/or green portions of the visible spectrum. The thickness of the foe pads 16, 18 are chosen such that the screens 12, 14 are urged into contact with an x-ray film 10, placed between them.

A portion of foam pad 16, affixed to tube side 4, is replaced by a lead blocker 26, in the area corresponding to the patient identification area on x-ray film 10. This prevents x-rays from causing exposure in the patient identification area.

A portion of screen 14 is replaced by a patient identification screen 20, comprising a prompt emission phosphor 19 coated upon a substrate 21 that is transparent to red and/or infrared wavelengths. Prompt emission phosphor 19 is selected to absorb infrared wavelengths and to emit in the blue and/or green portions of the visible spectrum.

An aperture 24 is cut through foam pad 18, adjacent the patient identification area, and a window 22 is mounted in cover 6, directly above the patient identification area. Window 22 is manufactured from a material transparent to red and/or infrared wavelengths.

Either window 22 and/or the substrate 21 for patient identification screen 20 is manufactured from a material which excludes the majority of light in the visible portion of the spectrum, thus maintaining the normal light tight integrity of the cassette.

Within the preferred embodiment, patient identification information is placed on x-ray film 10 by optically focusing red and/or infrared image onto patient identification screen 20, through window 22 and aperture 24. The red and/or infrared wavelengths will be absorbed by patient identification screen 20, which absorption will cause an emission in the blue and/or green part of the spectrum, thus, imprinting the information onto x-ray film 10.

The previously discussed configuration is the preferred embodiment of the present invention. Other embodiments are also feasible. An example would be a configuration for a storage phosphor cassette having a perimeter frame supporting identification screen 20 in contact with the storage phosphor element.

A preferred material for the patient identification screen 20 in this windowless cassette application is one that does not require a pre-exposure to allow for the release of visible light upon stimulation with red and/or IR radiation. Upconverters are such materials.

Upconverters are materials that absorb long wavelength (low energy) photons and give off shorter wavelength (higher energy) photons in response. There is no need to subject the materials to any type of pre-irradiation such as is done with x-ray or UV/visible storage phosphors such as BaFBr:Eu and SrS:Ce,Sm or CaS:Eu,Sm. Upconverters combine the effects of multiple photon absorption to generate electrons in higher energy levels than a single photon could achieve. When these electrons fall to a lower energy state, the photons given off can be of a significantly higher energy.

For a review of some upconverter materials and properties, see "Phosphors for the conversion of infrared radiation into visible light," J. L. Sommerdijk and A. Bril, Philips Technical Review, vol. 34, p. 24 (1974).

These materials are quite suitable for use in marking on film with red and/or IR radiation as described in the following example.

EXAMPLE

The green-emitting upconverter $NaY_{0.57}Yb_{0.39}Er_{0.04}F_4$ was prepared by the method described in "$NaYF_4$:Yb,Er— an efficient upconversion phosphor," N. Menyuk et al., Appl. Phys. Lett., vol. 21, no. 4, p. 159 (1972). A small amount of this phosphor was placed in a clear plastic container approximately 1 inch by 1 inch by 0.25 inch high. The layer of phosphor was approximately 0.5 mm thick. A slightly smaller than 1 inch by 1 inch piece of 7 mil thick clear plastic sheet was cut to fit inside this plastic container. A unique shape was cut from a piece of black optical masking tape and stuck to this 7 mil thick clear plastic sheet. This sheet with the unique shape of black tape on it was placed on top of the phosphor layer inside the plastic container. A window was cut in one side of a long black bag for holding 35 mm strips of film in the dark and two layers of Wratten 89B filter material was placed over this cut-out window and taped into place with black optical masking tape. This provides a container that blocks visible light out to roughly 680 nm from entering this black bag. Only in the window region covered by the Wratten 89B filters can radiation with wavelengths greater than 680 nm enter the bag.

A strip of green-sensitive x-ray film was placed in the bag. On top of the film, but inside the bag and under the Wratten 89B filters, was placed the plastic container with the phosphor layer and the 7 mil plastic sheet with the unique shape on it. The phosphor layer was closer to the film. The bag was sealed and brought out into the fluorescent lights of a typical office or laboratory. A tungsten bulb inside of a housing with fiber-optic pig-tails was used to illuminate this package (this light source was one of those used for illuminating objects for inspection with microscopes—a so-called fiber optic light). The output of one of the fiber-optic pig-tails was placed approximately 4 inches from the Wratten 89B window, and allowed to expose the sample for 5 seconds. Since this is a tungsten bulb, a significant amount of IR radiation is coming out of the pig-tail illuminator. The x-ray film was processed in a typical x-ray film processor well known to those in the radiographic imaging field. The shadow image of the unique shape was present on the film, with the surrounding area nearly maximum density. The image was a bit blurry because the phosphor was thick and the phosphor layer was held away from the film by the plastic container wall thickness of roughly 2 mm. The upconverter clearly exposed the film in those areas where the unique shape was transparent.

Another strip of film with the sample on top of it was loaded just as described above. This time the sample was placed about 6 feet from a typical cool white fluorescent bulb like that in an office or a lab for 10 minutes. The film was processed as above. No image was on the film.

Another strip of film without the sample on top of it was loaded in the bag. The same pigtail light source was used again about 4 inches away from the Wratten 89B window, but for 15 seconds. The film was processed as above. A very slight density appeared on the film indicative of a very, very weak sensitivity of the film to IR radiation.

The upconverter layer for this shutterless cassette design could be coated on a clear plastic support in a binder similar to that used for radiographic intensifying screens. The layer could be very thin so the IR image projected upon it could be rendered with as much detail as is desired. The materials suitable for this application are any upconverter material that converts red and/or IR radiation into higher energy UV/blue/green radiation for which the film is quite sensitive.

The basic design of the window 22 over the upconverter area of the x-ray cassette would be a material with a high optical density to visible radiation (at least those wavelengths for which the film has some sensitivity), but a lower optical density to red and/or IR radiation so an image can be projected through window 22 on to the upconverter layer which in turn exposes the film. There could be some optical density to the red and/or IR radiation, in said window to protect from exposure to ambient red and/or IR radiation that could darken the film. Given the non-linear behavior of these upconverter materials (typically a quadratic dependence), a weak exposure to red and/or IR will generate a very weak higher energy emission. Film is very non-linear in its response and reciprocity failure occurs, therefore for a given total energy exposure to achieve a given density, a 1000 times reduction in exposure intensity for an exposure period of a 1000 times longer will not result in the same (or any) density. This is reciprocity failure. Hence, with a proper balance of ambient red and/or IR radiation intensity with the intensity achievable with a red and/or IR image generation device, the cassette could be exposed to ambient light for a long period of time, yet a very brief exposure at a much higher red and/or IR intensity would easily write the image to the film.

Such image generating devices might be an LED matrix display unit, rasterized red and/or infrared beam or a vectored red and/or infrared beam. These image generating devices could typically be incorporated into a patient identification camera apparatus.

The image receiving element could conceivably be a storage phosphor (not shown) sensitive to electromagnetic radiation within ultraviolet or visible wavelengths. Accordingly the radiation sensitive material near the window of the cassette would have emit energy within the ultraviolet or visible spectrum.

The invention has been described with reference to a preferred embodiment. However, it will be appreciated that variations and modifications can be effected by a person of ordinary skill in the art without departing from the scope of the invention.

PARTS LIST 2 x-ray cassette
4 tube side panel
6 cover
8 locking structure
10 x-ray film
12 intensifying screen
14 intensifying screen
16 foam pad
18 foam pad
19 prompt emission stimulable phosphor
20 patient identification screen
21 substrate
22 window
24 aperture
26 lead blocker

We claim:

1. Art x-ray cassette having patient identification features comprising:
   a cover;
   a window in the cover having predetermined transmission characteristics;
   a prompt emission stimulable phosphor coated substrate positioned essentially below the window having a phosphor that is selected to absorb at a first bandwidth and emit at a second bandwidth and the substrate is selected to transmit at least the first bandwidth;
   an image receiving element sensitive to electromagnetic radiation of the second bandwidth positioned at least below the window; and
   means for placing the phosphor coated substrate against the image receiving element.

2. The x-ray cassette of claim 1 wherein said substrate is relatively transparent to a bandwidth of about red to infrared wavelengths.

3. The x-ray cassette of claim 2 wherein said prompt emission stimulable phosphor is an energy absorbing phosphor that absorbs electromagnetic radiation in the bandwidth of about red to infrared and emits electromagnetic energy in a bandwidth having wavelengths less than red.

4. The x-ray cassette of claim 1 wherein the substrate is opaque to electromagnetic energy having wavelengths less than about the bandwidth of about red to infrared.

5. The cassette of claim 1 wherein the window is substantially transparent to energy in the bandwidth of about red to infrared red portion of the electromagnetic spectrum and substantially opaque to visible electromagnetic radiation having wavelengths less than about the bandwidth of about red to infrared.

6. The cassette of claim 1 wherein the image receiving element further comprises one of the following: film; or storage phosphor.

7. A method of storing patient information on an x-ray cassette that is capable comprising the steps of:
   firstly providing the x-ray cassette such that it has a cover that is substantially opaque to visible electromagnetic radiation, with a window within the cover that is substantially transparent to electromagnetic radiation within at least a first predetermined bandwidth and an image receiving element within the cassette that is sensitive to electromagnetic radiation of a second predetermined bandwidth;
   secondly providing a radiation sensitive material positioned to receive electromagnetic radiation of at least the first predetermined bandwidth incident upon the window, the radiation sensitive material being sensitive to electromagnetic radiation of the first predetermined bandwidth and emits radiation of the second predetermined bandwidth;
   thirdly providing means for placing the radiation sensitive material in close proximity to the image receiving element; and
   irradiating the window with electromagnetic radiation of the first bandwidth having modulated data contained thereon.

8. The method of claim 7 wherein the radiation sensitive material further comprises a prompt emission stimulable phosphor coated substrate positioned at least within the window portion of the cassette such that electromagnetic radiation of the first bandwidth incident upon the window results in radiation of the second bandwidth being incident upon the image receiving element.

9. The method of claim 8 wherein the first predetermined bandwidth further comprises radiation in a bandwidth of about red to infrared and the irradiating step further comprises irradiating a red to infrared image of the modulated data onto the prompt emission stimulable phosphor coated substrate.

10. The method of claim 9 wherein the secondly providing step further comprises the prompt emission stimulable phosphor coated substrate having the substrate being relatively transparent to energy in the red to infrared portion of the electromagnetic spectrum, said coating emitting energy in the ultraviolet to visible portion of the electromagnetic spectrum, said coating positioned adjacent to the image receiving element, and the image receiving element further comprising an x-ray film, the x-ray film being capable of exposure by the ultraviolet to visible portion of the electromagnetic spectrum.

11. A patient identification x-ray cassette comprising:
   a cover enclosing a film that is sensitive to electromagnetic radiation within a predetermined bandwidth;
   a window in the cover having predetermined transmission characteristics;
   a patient identification screen below the window comprising a prompt emission stimulable phosphor coated substrate, said phosphor absorbing energy in the red to infrared portion of the electromagnetic spectrum, said phosphor emitting energy in the visible portion of the electromagnetic spectrum, said substrate being relatively transparent to red to infrared wavelengths; and
   a resilient material between the cover and the patient identification screen, in juxtaposition that it abuts both the patient identification screen and the cover.

12. The cassette of claim 11 wherein the substrate is opaque to energy in the visible portion of the electromagnetic spectrum.

13. The means of claim 12, further comprising the window being relatively transparent to energy in the red to infrared portion of the electromagnetic spectrum, said window being opaque to energy in the visible portion of the electromagnetic portion of the spectrum.

* * * * *

UNITED STATES PATENT AND TRADEMARK OFFICE
CERTIFICATE OF CORRECTION

PATENT NO. : 5,659,592
DATED : August 19, 1997
INVENTOR(S) : Jeffrey C. Robertson, et. al.

It is certified that error appears in the above-identified patent and that said Letters Patent is hereby corrected as shown below:

Column 5, line 29, "Art x-ray cassette" should read--An x-ray cassette--.

Signed and Sealed this

Sixteenth Day of December, 1997

Attest:

BRUCE LEHMAN

*Attesting Officer*  *Commissioner of Patents and Trademarks*